Dec. 29, 1925.

V. YNGVE

DRY CELL

Filed Nov. 14, 1923

1,567,561

INVENTOR
VICTOR YNGVE
BY
ATTORNEY

Patented Dec. 29, 1925.

1,567,561

UNITED STATES PATENT OFFICE.

VICTOR YNGVE, OF SOUTH ORANGE, NEW JERSEY, ASSIGNOR TO MANHATTAN ELECTRICAL SUPPLY COMPANY, INC., OF NEW YORK, N. Y., A CORPORATION OF MASSACHUSETTS.

DRY CELL.

Application filed November 14, 1923. Serial No. 674,611.

*To all whom it may concern:*

Be it known that I, VICTOR YNGVE, residing at South Orange, in the county of Essex and State of New Jersey, United States of America, having invented certain new and useful Improvements in Dry Cells (Case 3), do hereby declare that the following is a full, clear, and exact description of the same.

This invention relates to dry cells and more particularly to improvements in dry cells of the Leclanché type.

Dry cells are usually assembled by tamping a suitable mixture composed of a depolarizer (e. g. manganese dioxid) and a conducting material (e. g. carbon) inside of a zinc can and around a centrally located carbon electrode. It has been found that when such cells are discharged, a hard outer layer forms in the depolarizing mix adjacent to the paper or other bibulous liner that separates this mixture from the zinc electrode. This layer varies in thickness from about ⅛ to 1/32 of an inch and is probably caused either by the cementing action of a basic zinc compound or by the loss of the available liquid or both. The hardened layer increases the internal resistance of the cell and makes electrolytic conduction in the outer layer very difficult. This is particularly objectionable because as soon as the depolarizer in this outer layer is consumed, all of the current which the cell gives must be carried through this layer by electrolytic conduction.

It is the object of the present invention to remedy the above outlined drawbacks; by preventing or delaying the formation of such hard outer layer in the mix. In accordance with the preferred embodiment of the present invention I accomplish this by composing the depolarizing mix of a plurality of layers the consistency of which may be varied. According to one of the features of the invention the depolarizing mix is composed of compacted tablets such as described in a copending application of W. F. Hendry, Ser. No. 654,611, filed July 30, 1923. In accordance with my invention these tablets are composed of a plurality of sections preferably in the form of concentric rings, the consistency of each ring being different. The consistency, degree of bibulousness, conductivity, etc. of each layer of depolarizing mix may thus be determined at will.

Figure 1:
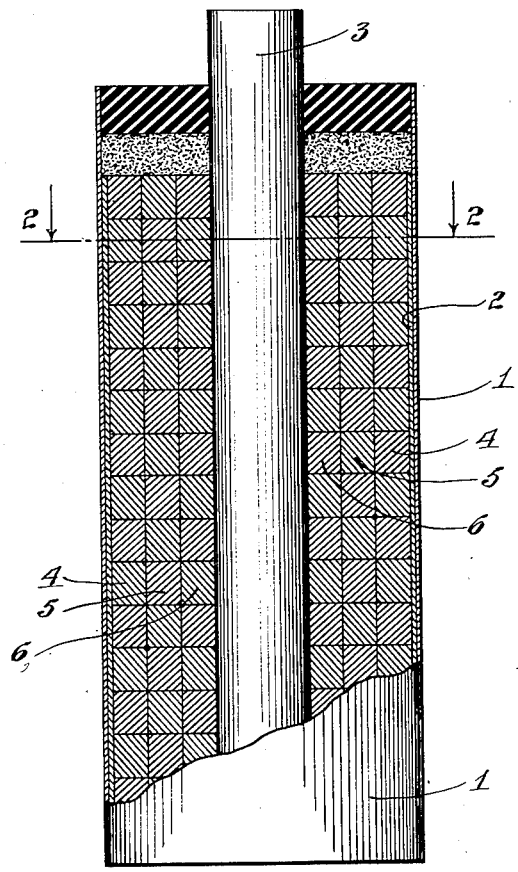
Figure 2:
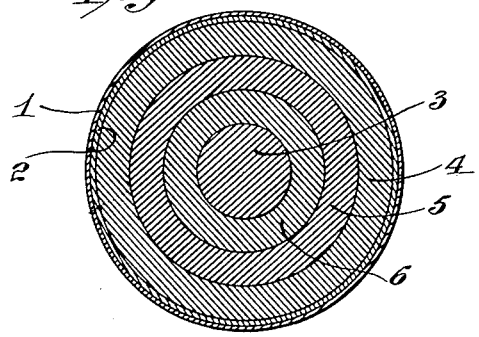

The invention will be more clearly understood from the following detailed description of a preferred embodiment thereof and with reference to the drawings in which Fig. 1 is a horizontal and Fig. 2 a vertical cross section (along lines 2—2 of Fig. 1) of a dry cell constructed in accordance with the present invention.

1 is a zinc can within which a suitable paper liner 2 is provided. A centrally located carbon electrode 3 is surrounded by a plurality of annular washers each washer consisting of a plurality of concentric rings 4, 5 and 6, one fitting within the other, the ring 4 contacting with the paper liner and the ring 6 surrounding the carbon electrode 3. The outer ring 4 may be composed of a coarser mix of depolarizing conducting material or mix to which has been added an inert absorbent material such as sawdust or shredded paper. The rings 4 constituting the outer layer of depolarizing material which separates the two electrodes will be adapted therefore to absorb a relatively large quantity of liquid whereby its hardening will be prevented or delayed. The second ring 5 might contain a finer mix while the third ring 6 a still finer mix containing a high percentage of carbonaceous material.

The ratio of manganese dioxid and graphite or other carbonaceous material can be varied from one ring to the other so as to secure a cell giving maximum service. It will be seen therefore that the internal structure of the cell may be varied so as to adapt it to various types of service and conditions. Obviously, the number of the concentric rings their shape or combination may be varied within wide limits without departing from the spirit of the present invention.

What I claim is:

1. In a dry cell, a depolarizing mix composed of a plurality of compacted washers, each washer composed of a plurality of separate sections of varying consistency.

2. In a dry cell, a depolarizing mix composed of a plurality of compacted washers, each washer composed of a plurality of separate sections of varying composition.

3. In a dry cell, two electrodes, and washers compacted of depolarizing mix, each washer composed of a plurality of separate sections.

4. In a dry cell, two electrodes, separated by vertical and horizontal layers of tablets compacted of depolarizing mixture.

5. In a dry cell, a container electrode, a second electrode centrally located therein, and a plurality of washers separating said electrodes, each washer consisting of a plurality of separate sections.

6. In a dry cell, a container electrode, a second electrode centrally located therein, and a plurality of annular washers separating said electrodes, each washer composed of a plurality of separate concentric rings.

7. In a dry cell, a zinc container electrode, a carbon electrode centrally located therein, a plurality of annular washers surrounding said carbon electrode, each washer consisting of a plurality of concentric rings one fitting within the opening of another and each ring compacted of different mixtures.

In witness whereof, I hereunto subscribe my name this 9th day of November 1923.

VICTOR YNGVE.